United States Patent
Boelter

[15] 3,676,767
[45] July 11, 1972

[54] DEVICE FOR AUTOMATICALLY IDENTIFYING UNKNOWN TRANSISTORS

[72] Inventor: Donald A. Boelter, Indianapolis, Ind.
[73] Assignee: General Aviation Electronics, Inc., Indianapolis, Ind.
[22] Filed: July 25, 1969
[21] Appl. No.: 844,814

[52] U.S. Cl. .................................... 324/158 D, 324/158 T
[51] Int. Cl. ......................................................... G01r 31/22
[58] Field of Search ................... 324/158 D, 158 T, 158, 73, 324/62

[56] References Cited

UNITED STATES PATENTS

2,895,106  7/1959  Taunt ................................. 324/158
3,458,814  7/1969  Ryan .................................. 324/158

OTHER PUBLICATIONS

Crowhurst, N. H., " High Accuracy Ohmeter," Radio-Electronics, August 1954, pages 36-38

*Primary Examiner*—Rudolph V. Rolinec
*Assistant Examiner*—Ernest F. Karlsen
*Attorney*—Woodard, Weikart, Emhardt & Naughton

[57] ABSTRACT

Process and apparatus for checking transistors and diodes to determine whether a transistor is NPN or PNP, to determine whether the transistor is germanium or silicon and also to determine the polarity of a diode. The checking device may include a pair of spaced terminals, a known alternating voltage source and a known resistance, with the terminals, source and resistance in a chain whereby connecting of the base of the transistor to one terminal and the collector and emitter to the other terminal places the source, terminals, transistor and resistance in a series circuit. A meter may then be used to measure the direction and amplitude of current through the circuit or, alternatively, the direction and amplitude of current can be used to actuate indicating devices, and, if desired, further electrical circuitry for performing additional tests on the transistors.

4 Claims, 5 Drawing Figures

INVENTOR.
DONALD A. BOELTER
BY
Woodard, Weikart, Emhardt & Naughton
ATTORNEYS

DEVICE FOR AUTOMATICALLY IDENTIFYING UNKNOWN TRANSISTORS

BACKGROUND OF THE INVENTION

1. Field of the Invention

This invention relates to process and apparatus for testing transistors and diodes.

2. Description of the Prior Art

Various prior art devices and methods are known for testing transistors. Examples of some of these devices and methods are disclosed in the following U.S. Pat. Nos.: 3,041,537 to Cagle; 2,946,008 to Kallman; 2,899,642 to Hussey; 2,863,119 to Davis, Jr.,; 2,779,922 to Davidson and 2,748,349 to Dickten, Jr. and in the following publications: Radio Electronics—February 1959 page 56—"Direct Reading Transistor Tester" and Radio Electronics—September 1957 pages 51 and 52 "-Simple Power Transistor Test," None of these prior art disclosures provide a process or apparatus for identifying an unmarked transistor in terms of its polarity NPN or PNP and its basic material silicon or germanium. If a transistor is to be so identified as to its polarity (NPN or PNP or in the case of a diode, the cathode or anode terminal) several techniques are used all of which require an excessive amount of time or relatively expensive equipment. In many cases, especially that of the casual experimenter, the techniques are not known or the equipment involved is not available.

SUMMARY OF THE INVENTION

One embodiment of the method of this invention might involve a process for checking a component to determine its polarity which comprises connecting the component in series with a resistor of given resistance and a known alternating voltage source, measuring the voltage across the resistor, and comparing the measurement with known values for components having known polarities and materials.

One embodiment of the apparatus of this invention might involve apparatus for checking a component to determine its polarity and basic material which apparatus comprises a known alternating voltage source; a known resistance; a pair of terminals arranged in spaced relation; said source, resistance and terminals being arranged in a chain with the terminals at the opposite ends of said chain whereby connecting of a component between said terminals places said source, terminals, component, and resistance in a series circuit; and means for measuring the direction and amplitude of current through said circuit.

Objects of this invention are to provide an improved method and apparatus for testing transistors and diodes as to polarity and basic material and to provide an inexpensive and easy-to-use method for such testing.

DESCRIPTION OF THE PREFERRED EMBODIMENTS

Figure 1:
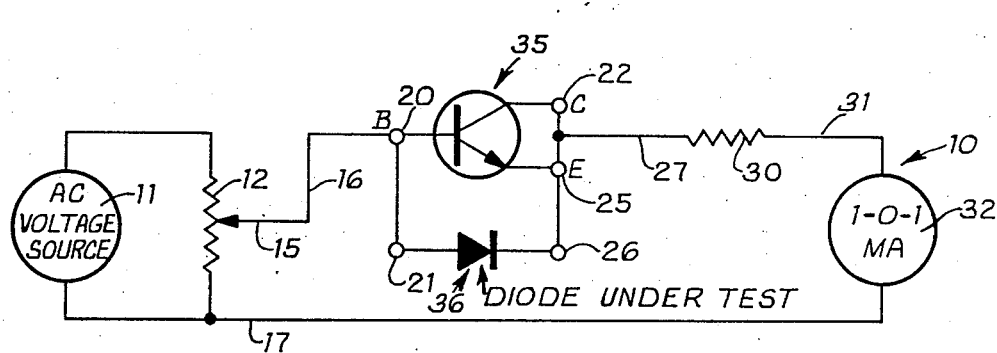
FIG. 1 is an electrical schematic diagram of the basic circuit of the present invention.

Referring now more particularly to the drawings, there is illustrated in FIG. 1 a transistor tester 10 which includes an AC voltage source 11 connected in series with a resistor 12. In one specific embodiment of the invention the AC voltage source 11 might be 6 volts AC, 60 hertz frequency and the resistor 12 might be a 50 ohm resistor of two watts rated capacity. The resistor 12 has associated therewith a wiper 15. The combination of the resistor and the wiper function as a voltage divider making possible the providing of a desired voltage between the two lines 16 and 17. The circuit further includes terminals 20 and 21 connected to the line 16 and terminals 22, 25 and 26 connected to a line 27 which is in turn connected to a resistor 30. The resistor 30 is in turn connected to a wire 31 which is connected to the 1-0-1 milliammeter 32. The circuit is completed by the connection of the milliammeter to the line 17. The terminals 20, 22 and 25 are used for connecting the base, collector and emitter, respectively of a transistor 35 to be tested. The terminals 21 and 26 are used for connecting the opposite terminals of a diode 36 to be tested. The reading on the milliammeter indicates the polarity and basic material of the transistor or the diode being tested. Thus, the milliammeter might have a marked dial face having four markings thereon indicating NPN germanium, NPN silicon, PNP germanium and PNP silicon.

Figure 2:
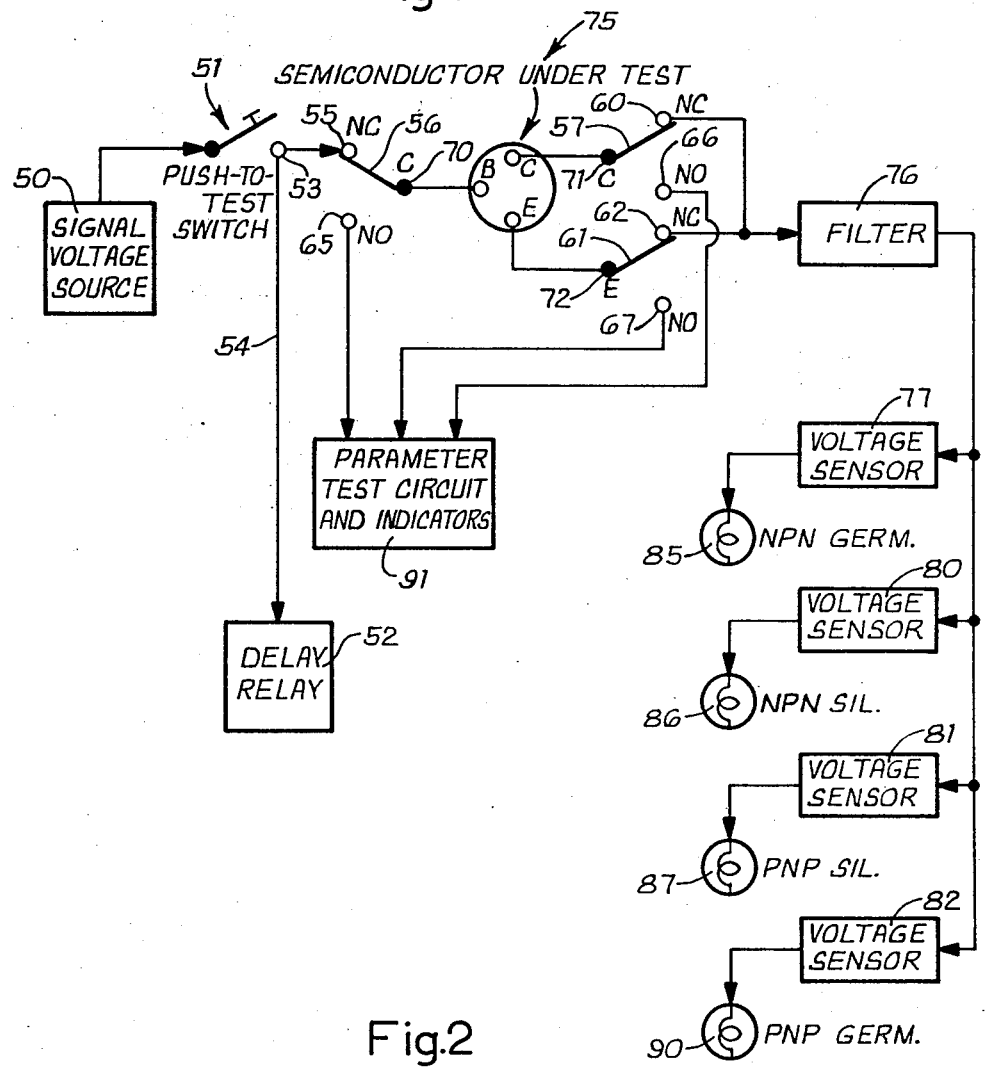
FIG. 2 is a block diagram of an alternative embodiment of the invention.

Referring to FIG. 2, there is illustrated in block diagram one example of an embodiment of the invention useful, for example, in checking transistors at incoming inspection in a manufacturing plant. The embodiment of FIG. 2 includes a signal voltage source 50 which is coupled to a "push to test" switch 51. The output terminal 53 of the "push to test" switch is coupled by a line 54 to a delay relay 52 which has normally closed contacts 55 and 56, normally closed contacts 57 and 60, and normally closed contacts 61 and 62. The relay 52 also has contacts 65, 66 and 67 which are closed with the respective contacts 56, 57 and 61 when the relay 52 is energized.

The circuit of FIG. 2 further includes terminals 70, 71 and 72 to which are coupled the base, collector and emitter, respectively, of the transistor 75 being tested. The terminals 60 and 62 are connected into a filter 76, the output of which is fed into four voltage sensors 77, 80, 81 and 82. The relay 52 is a delay relay which maintains the normally closed condition of contacts 55 and 56, contacts 57 and 60, and contacts 61 and 62 as illustrated in FIG. 2 for a period of time prior to moving its various contacts to close the contacts 56 and 65, the contacts 57 and 66, and the contacts 61 and 67. The output of each of the voltage sensors 77, 80, 81 and 82 is fed into indicator lights 85, 86, 87 and 90 respectively, with the respective lights having inscribed alongside thereof the following designations: NPN Germanium, NPN Silicon, PNP Silicon and PNP Germanium as illustrated.

The device operates upon closure of the "push to test" switch 51 to pass a particular signal through the transistor 75 under test. As a result, particular voltage is placed across the transistor which causes one of the sensors 77, 80, 81 or 82 to pass a voltage energizing its particular light 85, 86, 87 or 90. After a time delay determined by the relay 52, the contacts 55 and 56 open the contacts 57 and 60 open, the contacts 61 and 62 open also, the contacts 56 and 65 close, the contacts 57 and 66 close and the contacts 61 and 67 close. The various parameters of the transistor can then be checked and determined by conventional testing apparatus represented by the block 91 and disclosed, for example, in some of the above cited patents.

Figure 3:
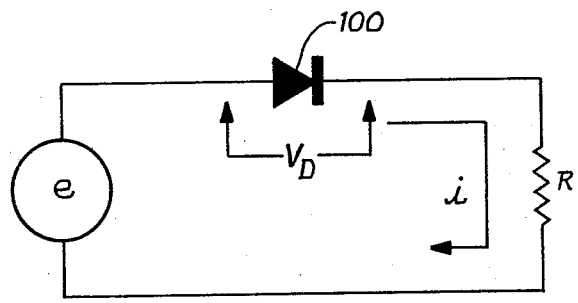
FIG. 3, 4 and 5 are electrical schematic diagrams illustrating the operation of the circuit of the present invention.

Referring to FIG. 3, the instantaneous current $i$ may be expressed as follows:

$$i = \pm (e - V_D/R) \quad (1)$$

$e$ = Instantaneous applied voltage
$V_D$ = Semiconductor forward voltage drop
$R$ = Total series resistance in loop If the junction of the semiconductor 100 is polarized as shown in FIG. 3, the current flow will be as shown. If the polarity is reversed, the current flow will reverse and be opposite to the direction shown. This effect is used to determine the polarity of the diode or transistor, cathode-anode or NPN-PNP respectively in each of the circuits of FIGS 1 and 2. The $V_D$ or forward voltage drop of the junction depends mainly on the base material of the junction. Silicon junctions exhibit 0.5 to 0.7 volts typical $V_D$ while germanium junctions have a $V_D$ of 0.1 to 0.2 volts. This inherent difference in the magnitude of $V_D$ is used to determine the material type. In one embodiment of the invention, $e$ was a 60 Hertz sinusoidal voltage of about 1.3 vrms. A 1-0-1 milliamp meter placed in the circuit in the manner of FIG. 1 was used to indicate the direction of flow and magnitude of the current produced when a semiconductor junction was inserted in the socket provided.

For the purpose of mathematically explaining the invention, it is more convenient to assume a square wave for $e$ in equation (1) above. The equation then becomes:

$$I_{avg} = \left(\frac{E - V_b}{R}\right) 1/2$$

Or:

$$I_{avg} = \pm \left(\frac{E - V_b}{2R}\right) \quad (2)$$

where $E$ = Peak value of the square wave.

Figure 4:
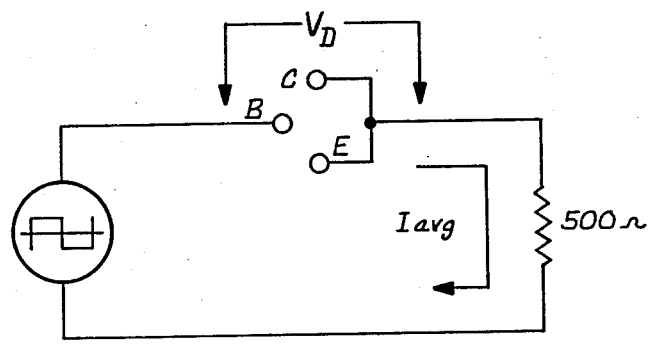

Referring now to the circuit in FIG. 4, with $E = 1.0$ volts peak and $R = 500$ ohms, the following currents may be computed for the four types of transistors:

NPN GERMANIUM:

$$I_{avg} = +\left(\frac{1.0 - .15}{1000}\right)$$

$$I_{avg} = +0.85 \text{ milliamps}$$

NPN SILICON:

$$I_{avg} = +\left(\frac{1.0 - 0.6}{1000}\right)$$

$$I_{avg} = +0.40 \text{ milliamps}$$

PNP GERMANIUM:

$$I_{avg} = -\left(\frac{1.0 - 0.15}{1000}\right)$$

$$I_{avg} = -0.85 \text{ milliamps}$$

PNP SILICON:

$$I_{avg} = -\left(\frac{1.0 - 0.6}{1000}\right)$$

$$I_{avg} = -0.40 \text{ milliamps}$$

Figure 5:
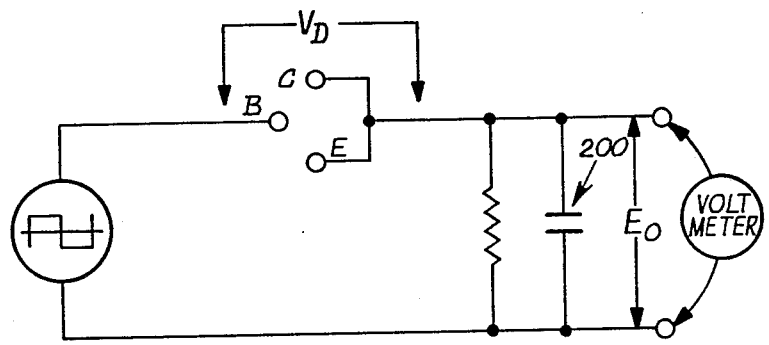

In FIG. 5 there is illustrated a capacitor 200 which functions as a long time constant filter. Thus, in FIG. 5 the voltage is measured or sensed across the filter 200 rather than the current as in, for example, FIG. 1. When this procedure is used, the equation for the output voltage is: $E_o = \pm (E - V_b)$. The resulting output voltages with the four different types of transistors inserted in the circuit may be computed in a similar manner to the above calculations for current.

The above examples of the invention should serve to indicate that the invention can take many forms depending upon the specific application involved.

What is claimed is:

1. A process for checking a component having a semiconductor rectifying junction to determine its polarity and basic material which comprises:
   a. connecting the component in series with a resistor of given resistance and a constant alternating voltage source having a voltage magnitude greater than the forward voltage threshold and less than the reverse breakdown voltage of any junction to be tested;
   b. measuring a parameter which is proportional to the current through said resistor to obtain a value which represents the constant alternating voltage source magnitude minus the forward voltage drop across the junction of said component under test and thus is inversely related to the value of the forward voltage drop across a junction of the component under test; and
   c. comparing the measured value of said parameter with known values for components having known polarities and materials.

2. The process of claim 1 in which the semiconductor rectifying junction is either silicon or germanium.

3. The process of claim 1 in which the constant alternating voltage source is over 0.7 volts peak voltage.

4. The process of claim 3 in which the constant alternating voltage source is a 60 Hertz sinusoidal voltage of about 1.3 volts rms.

* * * * *